United States Patent
Boroditsky et al.

(10) Patent No.: US 6,925,259 B2
(45) Date of Patent: Aug. 2, 2005

(54) MAC PROTOCOL FOR OPTICAL PACKET-SWITCHED RING NETWORK

(75) Inventors: Mikhail Boroditsky, Highlands, NJ (US); Nicholas J. Frigo, Red Bank, NJ (US); Aleksandra Smiljanic, Atlantic Highlands, NJ (US)

(73) Assignee: AT&T Corp., Bedminster, NJ (US)

( * ) Notice: Subject to any disclaimer, the term of this patent is extended or adjusted under 35 U.S.C. 154(b) by 625 days.

(21) Appl. No.: 09/940,020

(22) Filed: Aug. 27, 2001

(65) Prior Publication Data

US 2002/0105963 A1 Aug. 8, 2002

Related U.S. Application Data

(60) Provisional application No. 60/239,766, filed on Oct. 12, 2000, and provisional application No. 60/240,464, filed on Oct. 13, 2000.

(51) Int. Cl.[7] .............................................. H04J 14/00
(52) U.S. Cl. ........................................ 398/75; 398/79
(58) Field of Search ........................... 398/99, 75, 82, 398/2, 5, 101, 79, 54, 70–72, 102; 370/440, 389; 372/50

(56) References Cited

U.S. PATENT DOCUMENTS

| | | | |
|---|---|---|---|
| 5,452,115 A | * | 9/1995 | Tomioka ...................... 398/75 |
| 5,500,857 A | * | 3/1996 | Nakata ........................ 370/440 |
| 5,737,106 A | | 4/1998 | Sansonetti et al. |
| 5,760,935 A | * | 6/1998 | Sabry et al. .................. 398/75 |
| 5,764,392 A | * | 6/1998 | Van As et al. ............... 398/79 |
| 5,864,414 A | | 1/1999 | Barnsley et al. |
| 5,864,415 A | | 1/1999 | Williams et al. |
| 5,912,753 A | | 6/1999 | Cotter et al. |
| 5,963,350 A | | 10/1999 | Hill |
| 6,108,362 A | | 8/2000 | Adams et al. |
| 6,292,282 B1 | * | 9/2001 | Mossberg et al. .............. 398/99 |
| 6,411,410 B1 | * | 6/2002 | Wright et al. ................. 398/79 |
| 6,466,343 B1 | * | 10/2002 | Lahat et al. .................. 398/82 |
| 6,535,313 B1 | * | 3/2003 | Fatehi et al. ................ 398/101 |
| 6,538,777 B1 | * | 3/2003 | Barry et al. .................. 398/25 |
| 6,674,754 B1 | * | 1/2004 | Ofek .......................... 370/389 |
| 6,694,100 B1 | * | 2/2004 | Fatehi et al. .................. 398/99 |

OTHER PUBLICATIONS

Kannan, et al., "STWnet: A High Bandwidth Space–Time Wavelength Multiplexed Optical Switching Network," Proceedings of the IEEE Infocom '97, Los Alamitos, CA, vol. 2, Apr. 7, 1997, 777–784.

Kang, et al., "A broadband ring network: multichannel optical slotted ring," Computer Netowrks and ISDN Systems, North Holland Publ., Amsterdam, NL 27(9), Apr. 1, 1995, 1387–1398.

Zhong, et al., "Wavelength Routing–Based Photonic Packet Buffers and Their Applications in Photonic Packet Switching Systems," Journal of Lightwave Technology, 16(10), Oct. 1998, 1737–1745.

Copy of European Search Report dated Apr. 16, 2004 for corresponding European Patent Application No. 01308698.8.

* cited by examiner

Primary Examiner—M. R. Sedighian
Assistant Examiner—David C. Payne

(57) ABSTRACT

A flexible, credit-based MAC protocol along with an admission algorithm enhance the throughput capacity of a packet switched WDMA ring network utilizing packet wavelength stacking and unstacking.

2 Claims, 5 Drawing Sheets

MAC PROTOCOL FOR OPTICAL PACKET-SWITCHED RING NETWORK

CROSS REFERENCE TO RELATED APPLICATIONS

The present application claims priority from U.S. Provisional Patent Application Nos. 60/239,766, filed on Oct. 12, 2000 and 60/240,464, filed on Oct. 13, 2000, which are incorporated herein by reference.

STATEMENT REGARDING FEDERALLY SPONSORED RESEARCH

Not Applicable.

FIELD OF THE INVENTION

The present invention relates generally to communication systems and, more particularly, to optical communication networks.

BACKGROUND OF THE INVENTION

As is known in the art, an optical ring network includes a plurality of nodes connected by an optical fiber so as to form a ring that interconnects each of the nodes. Ring networks can include a plurality of fiber rings for network protection. Regional access networks with ring topologies are attractive because they easily recover from a single failure. Also, ring networks allow simple synchronization of geographically distant nodes. Media Access Control (MAC) protocols in ring networks ensure that nodes receive their negotiated bandwidths. A new bandwidth demand is accommodated depending on the available resources and applied MAC protocol. In single-channel ring networks where nodes operate at the aggregate link bit-rate, the admission control is relatively straightforward. For example, in the Fiber Distributed Data Interface (FDDI) protocol, the sum of all requested bit-rates should be less than the link bit-rate. In MAC protocols with spatial re-use, the sum of requested bit-rates passing through any link should be less than the link bit-rate.

However, with development of Wavelength Division Multiple Access (WDMA) technology, the total throughput of a packet-switched ring network can be significantly increased. Existing network architectures and protocols may not be able to utilize the enhanced throughput provided by WDMA technology.

It would, therefore, be desirable to provide an architecture for a WDMA packet-switched ring network that enhances the data throughput capacity. It would further be desirable to provide a MAC protocol for the novel architecture of the present invention. It would also be desirable to provide an admission algorithm to operate in conjunction with a MAC protocol for a high capacity packet-switched ring network.

SUMMARY OF THE INVENTION

The present invention provides an optical packet-switched ring network utilizing WDMA technology with enhanced throughput capacity. In one aspect of the invention, an optical packet-switched ring network includes an architecture in which each node has an optical switch, such as a 2×2 switch, connected to the ring fiber. A transmit switch, which can include a packet buffer, is connected to the optical switch. A wavelength stacking system stacks packets on multiple wavelengths to form a composite packet, which is provided to the transmit switch. A packet is added to the ring network when the transmit switch and the optical switch are set to the cross state.

In one embodiment, the wavelength stacking system includes a tunable laser coupled to a wavelength demultiplexer via a circulator. Delay lines and a reflector coupled to the demultiplexer operate to delay each wavelength by respective time slot multiples for alignment in time, i.e., stacked in wavelength.

The node can further include a buffering receive switch coupled to the optical switch for dropping packets from the ring network. A wavelength unstacking system is coupled to the receive switch for unstacking received packets. A packet is received when the optical switch and the receive switch are set to the cross state.

In a further aspect of the invention, a credit-based MAC protocol is provided for a packet-switched ring network. Nodes renew credit allocations one per frame period. Counters for each source-destination pair are loaded with a negotiated number of credits. Only queues with positive counter values can make a reservation. The frame ends when each queue is empty or is out of credits or frame length is reached.

In another aspect of the invention, a network includes an admission controller for determining whether bandwidth requests can be allocated to the corresponding source-destination pair. In one embodiment, the admission controller calculates whether the MAC protocol ensures a predetermined number of credits to the source-destination node pair in each frame for the existing credit allocation.

BRIEF DESCRIPTION OF THE DRAWINGS

The invention will be more fully understood from the following detailed description taken in conjunction with the accompanying drawings, in which.

DETAILED DESCRIPTION OF THE INVENTION

Figure 1:
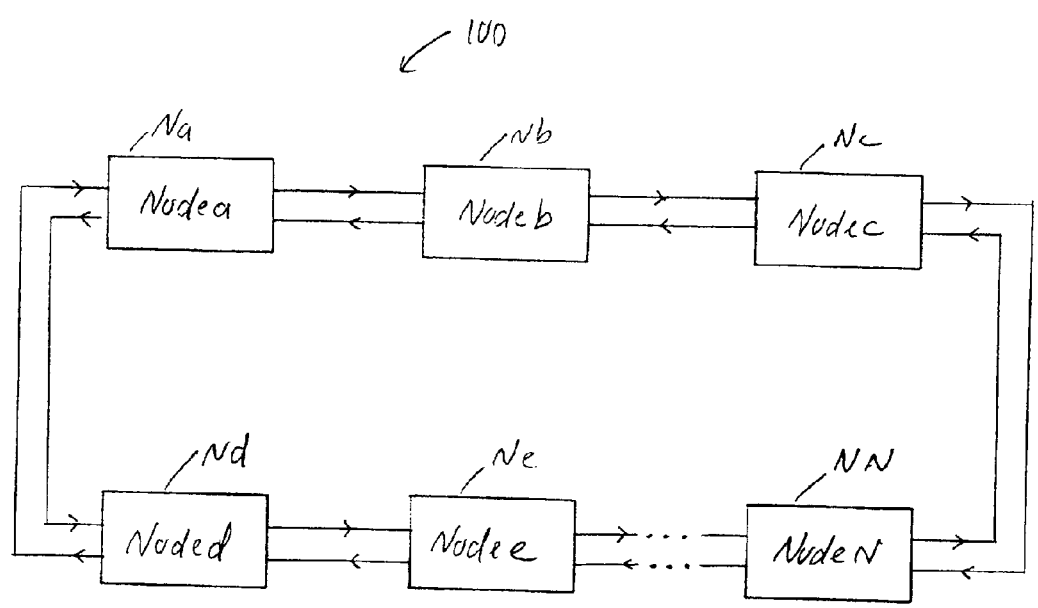
FIG. 1 is a schematic representation of a high-capacity optical packet-switched ring network in accordance with the present invention.

FIG. 1 shows an exemplary ring network 100 having an architecture that enhances the throughput of high-capacity packet-switched ring networks in accordance with the present invention. In general, network nodes Na-Nn access the entire link capacity by transmitting and receiving packets in parallel on all available wavelengths. Packets are added and dropped from the ring by optical switches, which avoid the need for problematic fast tunable receivers. The bandwidth allocation of the network is more flexible than in networks having fixed tuned or slow tunable receivers. In one embodiment, a MAC protocol for the packet-switched ring network is based on credits and a dynamic admission control algorithm requires minimal processing complexity and can follow fast traffic changes.

Figure 2:
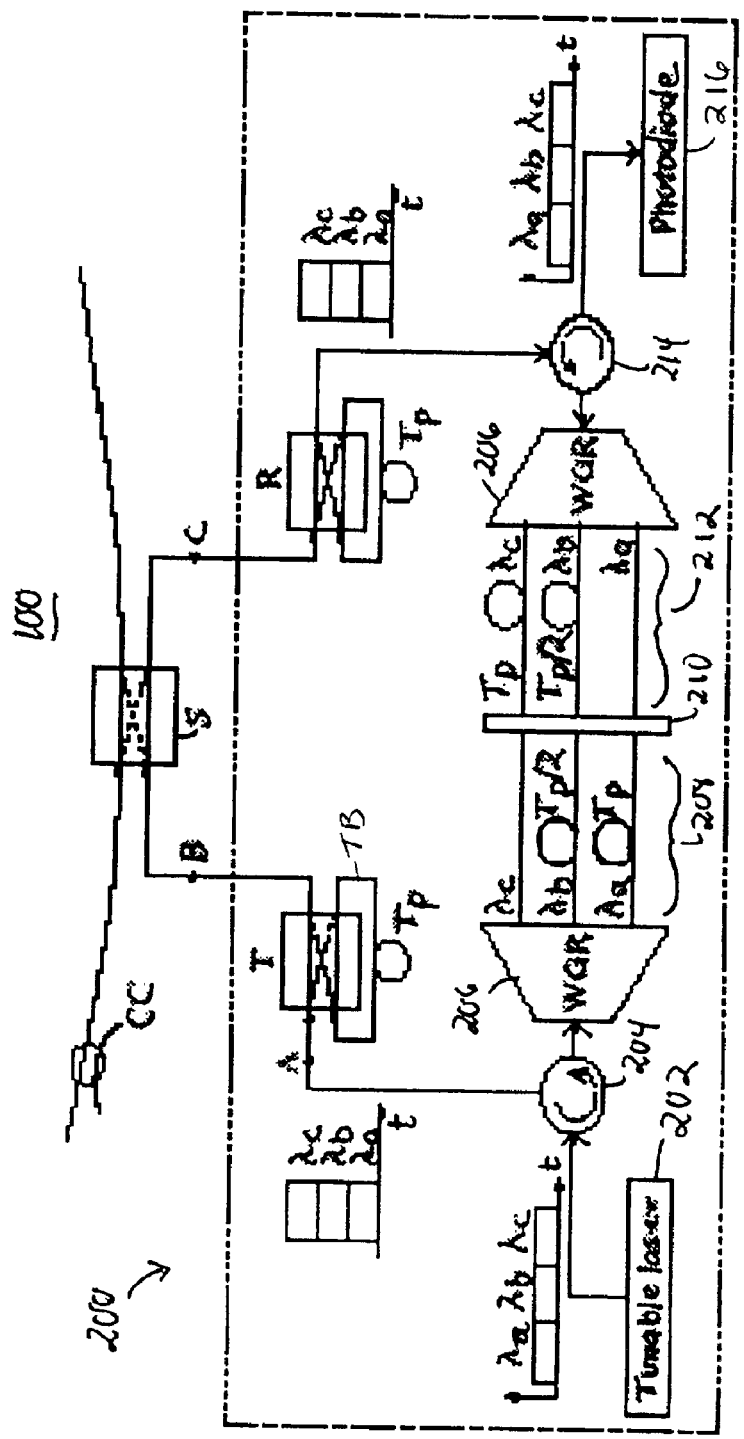
FIG. 2 is a schematic representation showing further details of the network of FIG. 1.

FIG. 2 shows further details of an exemplary node 200 of a WDMA packet-switched ring network 100 in accordance with the present invention. The network architecture is based upon "wavelength stacking," which is described in U.S. Provisional Patent Application No. 60/240,464, filed on Oct. 13, 2000. In general, time is divided into slots of duration $T_p$ with a control channel CC used for network and packet management. A composite (multi-wavelength) packet is created by a fast tunable laser 202 in contiguous time slots at W, e.g., three ($\lambda$a, $\lambda$b, $\lambda$c), different wavelengths. The composite packet is directed by a circulator 204 to a wavelength demultiplexer 206 followed by a bank of delay lines 208 and a reflector 210. The different wavelength components $\lambda$a, $\lambda$b, $\lambda$c are delayed by multiples of $T_p$ so that they are aligned in time and "stacked" in wavelength.

The wavelength-stacked packet is directed from the circulator 204 to a transmit switch T, which can include a packet buffer TB, to the input of an optical switch S, which can be provided as a 2×2 switch. A receive switch R provides packets from the optical switch S to a receive circulator 214. The received packet is unstacked through a wavelength demultiplexer 206 and reflector 210, which can be the same demultiplexer and reflector used on the transmit side, and a bank of delay lines 212. A detector 216, such as a photodiode, is used to extract data from the unstacked packets.

The optical switch S operates in conjunction with the transmit and receive switches T, R to add and drop packets from the ring network. More particularly, the transmit switch T stores a packet that has been stacked, but not yet transmitted, while another packet is being stacked. The receive switch R stores a packet that has arrived, while another packet is being unstacked. By using the optical switch S for packet transmissions and receptions, the need for relatively problematic fast tunable receivers is avoided. With this arrangement, the MAC protocol and admission control algorithm are significantly simplified with respect to the network where wavelengths are pre-allocated to the receivers and accessed individually, as described more fully below. The MAC/admission simplification occurs since traffic is balanced over wavelengths at the physical layer rather than at higher layers (by the MAC and admission control protocols).

Figure 3:
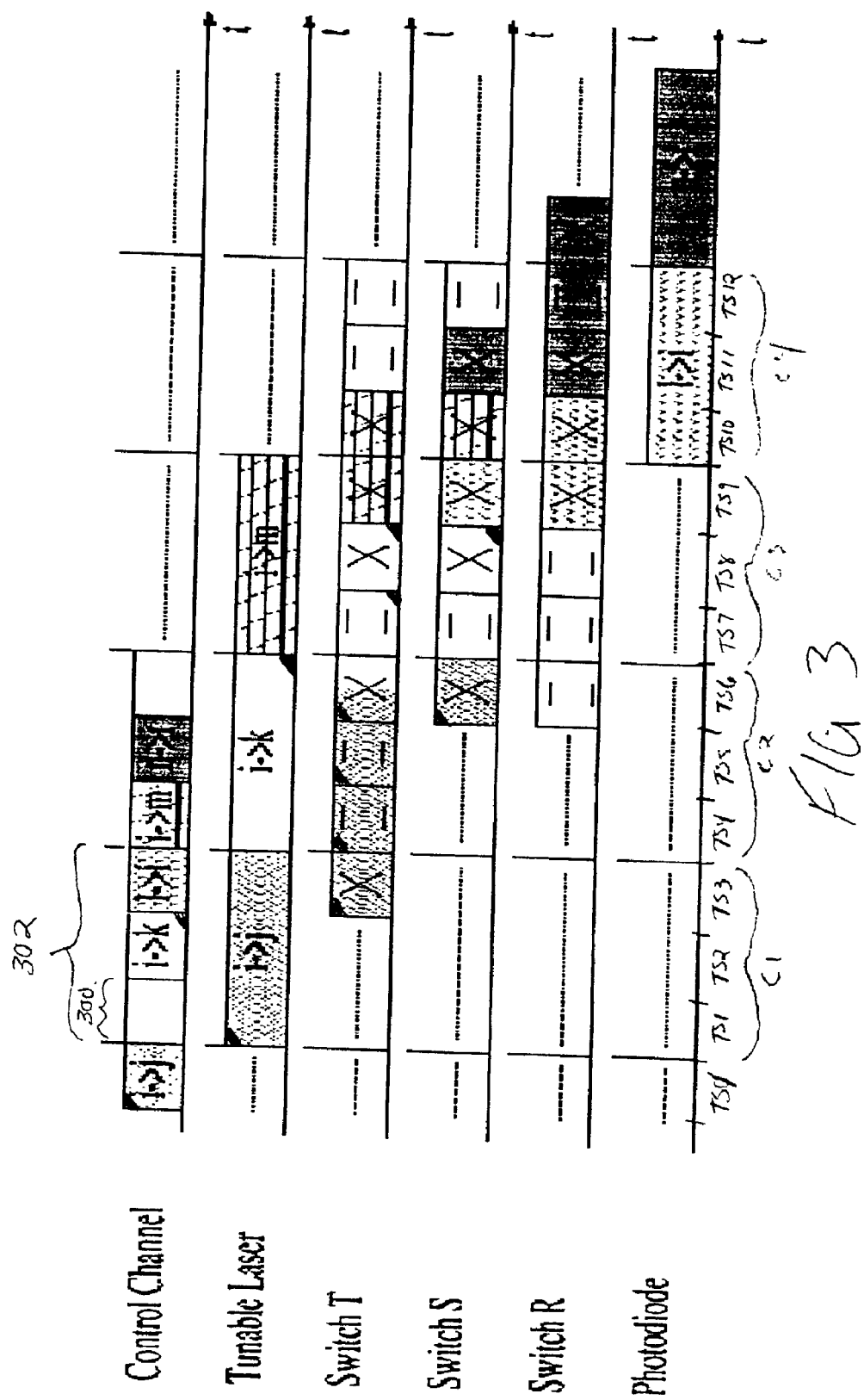
FIG. 3 is a timing diagram for a high-capacity optical packet-switched ring network in accordance with the present invention.

FIG. 3 shows an exemplary timing diagram for a three (W=3) wavelength packet. In general, because wavelength stacking takes W time slots to effect, a node must decide in advance when to access the medium. A separate wavelength is used as a control channel CC for the advanced reservations. Time slots 300 are grouped into cycles 302 of length W, which is shown as three cycles (W=3). Each node can transmit and receive at most one packet within each cycle 302 to facilitate packet stacking and unstacking. A node listens to the control channel and stores the chosen destinations in a potentially empty slot of the current reservation cycle. The node reserves some of the remaining destinations not chosen in the current cycle for which it has packets and unused credits. The destination node deletes the reservation made for it, and possibly makes a new reservation.

The timing diagram shows packet transmission and reception for a given node i in the ring network, such as the ring network 100 shown in FIGS. 1 and 2. Whenever node i reserves a time slot TS0, the node tunable laser 202 (FIG. 2) starts transmission at the beginning of the next cycle C1. Wavelength stacking is completed in the last time slot TS3 of this cycle C1, and the packet is stored into the buffer TB by setting the transmission switch T to the cross state. It is understood that switch cross states are shown with a cross, i.e., "X," and bar states are shown by opposing bars, i.e., "⏐⏐." A packet is stored as long as the transmit switch T is in the bar state, and is transmitted to the network by setting the transmit and optical switches T, S to the cross states 2W (6) time slots after the reservation TS6. Whenever, such as at the third time slot TS3, the node recognizes a packet with its address, the node stores the packet 2W time slots later TS9 by setting the optical and receive switches S, R in the cross states. The node starts unstacking the packet at the beginning of the next cycle TS10 by maintaining the receive switch R in the cross state.

Figure 4:
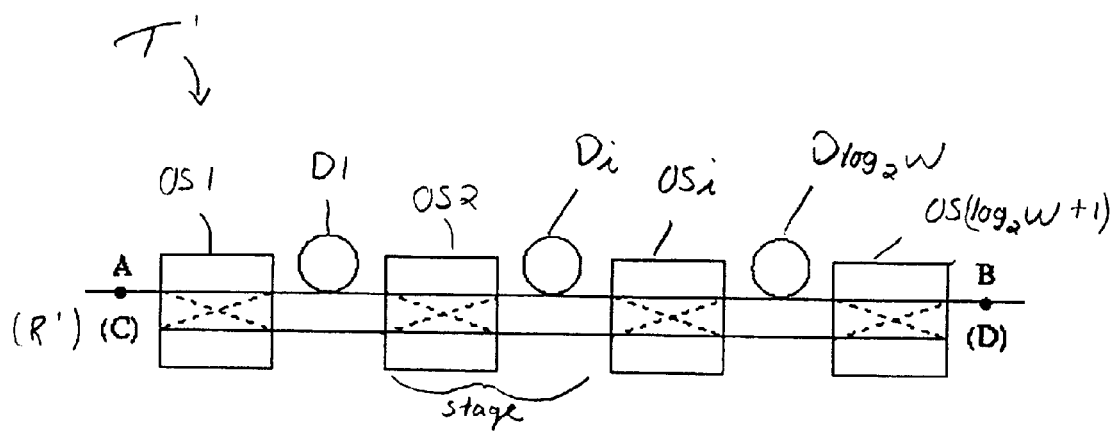
FIG. 4 is a schematic diagram of one embodiment of a transmit (receive) switch that can form a part of a high-capacity optical packet-switched ring network in accordance with the present invention.

FIG. 4 shows an alternative transmit switch T' for a packet-switched ring network in accordance with the present invention. It is understood that an alternative receive (R') switch can have the same configuration as the transmit switch T'. The transmit switch T' includes a rapidly tunable delay line (RTDL) having $\log_2 W$ stages, each of which comprises a respective 2×2 optical switch OS1-OS$\log_2$W followed by an optical delay line D1-D$\log_2$W. The delay of the ith stage is $D_i = WT_p/2^i$. The total delay through the RTDL can range from $T_p$ to $WT_p$ in the increments of $T_p$ by setting 2×2 switches to the appropriate states.

Each packet is stacked and transmitted through the RTDL in the last frame of a cycle, and leaves the RTDL to enter the ring network by putting switch S (FIG. 2) in the cross state exactly two cycles after it has been announced on the control channel, as shown in FIG. 3. On the other side, the packet is received from the ring by putting switch S in the cross state exactly two cycles after its announcement, and delayed through the RTDL until the beginning of the next cycle when it is unstacked.

It is understood that the switches T, R, S are fully coordinated. In other words, transmitted and received packets do not require opposite setups of the switches in the same time slot. The transmit switch T has to be in the bar state only while it stores a packet prior to its transmission and there can be only one such packet. The bar state for the transmission switch T is only required up to the last slot of the cycle, which is before it might have to be switched to the cross state in order to store a new packet. Similarly, switch R must be in the bar state only while it stores the received packet until the beginning of the next cycle. So, the bar state of switch R will end before it might have to be switched to the cross state in order to store a new received packet in the next cycle. In addition, no packets will be sent from a transmitter over point B (FIG. 2) to be unstacked in the receiver. A packet is possibly present at point A (FIG. 2) only in the last time slot of a cycle, and in this case it is stored by setting T into the cross state.

In general, the nodes renew their credits once per frame period, i.e., they load their counters with the negotiated numbers of credits $c_{ij}=a_{ij}$; $1 \leq i, j \leq N$ at the beginning of each frame. It is understood that only a queue with positive counters can make a reservation, and its counter $c_{ij}$ is decremented by 1. The queues and credit allocations are examined to start a new frame when each queue is either empty or is out of credits as set forth below in Equation 1:

$$I = \sum_{i,j} q_{ij} \cdot c_{ij} = 0, \qquad \text{Eq. (1)}$$

where $q_{ij}$ is the number of packets in queue (i,j), and $c_{ij}$ is the number of credits in each queue. Note that some node source-destination pairs may not use their credits if they do not have enough traffic. In that case, frames will shorten (I=0 before the end of the frame) and other source-destination pairs will get credits more often, i.e., share the excess bandwidth.

In an illustrative embodiment, an admission controller is placed at a given node for analyzing whether newly requested bandwidths can be allocated to the particular source-destination pair. More particularly, the admission controller calculates if the MAC protocol ensures $\Delta\ a_{ij}$ new credits to the node pair (i,j) in each frame (which is no longer than $F_{max}$ time slots) for the existing credit allocation $a_{kl}$, $1 \leq k$, $1 \leq N$, where N is the number of nodes.

The network architecture and MAC protocol ensure $a_{ij} > 0$ time slots to node source-destination pair (i,j), $1 \leq i$, $j \leq N$, within a frame of length $\leq F_{max}$, if the conditions expressed in Equation 2 below are satisfied:

$$W \cdot \left( \sum_{l} a_{il} + \sum_{k} a_{kj} \right) + \sum_{\substack{k,l \\ k \to i \to l}} a_{kl} \leq F_{max}. \quad \text{Eq. (2)}$$

where k, l, k→i→l are nodes such that node k transmits packets to node l over node i, and $a_{il}$, $a_{kj}$, and $a_{kl}$ represent the respective time slots assigned to the node source-destination pair. The credits associated with the source node (i) and the destination node (j) are multiplied by the number of wavelengths W due to time required for stacking and unstacking the composite packet. That is, as described above in conjunction with FIG. 3, each time slot 300 is grouped in cycles of length W so that each node can transmit and receive at most one packet within each cycle 302. In general, Equation 2 examines the credits already assigned to the source node (i), the destination node (j), and nodes (l) passing packets from the source node (i) to determine if there is sufficient remaining bandwidth to accommodate the requested additional bandwidth.

For example, if $t_{max}$ is the last time slot assigned to source-destination pair (i,j), which is in cycle $f_{max}$, in any cycle $f \leq f_{max}$, either node i transmits a packet or node j receives a packet, or all time slots are busy when passing node i. If there is an empty slot in cycle $f \leq f_{max}$, and destination node j is not reserved, node i reserves it because node i still has unused credits. There are at most $\Sigma_{l \neq j} a_{il} + \Sigma_{k \neq i} a_{kj} + a_{ij} - 1$ cycles before $f_{max}$ in which either source i or destination j are busy. These cycles occupy at most $W(\Sigma_{l \neq j} a_{il} + \Sigma_{k \neq i} a_{kj} + a_{ij} - 1)$ time slots. That is, the cycles are no more than the sum of the number of credits assigned to another destination node, i.e., not node j, the credits assigned to source node other than node i, and the credits already assigned to source-destination node pair i,j. The remainder of the cycles that are fully occupied comprise at most $$\sum_{\substack{k,l \\ k \to i \to l}} a_{kl}$$

time slots. As shown in Equation 3 below, the system determines whether the sums of these cycles are less than the last time slot in the frame:

$$t_{max} \leq \cdot W \cdot \left( \sum_{l \neq j} a_{il} + \sum_{k \neq i} a_{kj} + a_{ij} - 1 \right) + \sum_{\substack{k,l \\ k \to i \to l}} a_{kl}; \quad \text{Eq. (3)}$$

where $_{k,l\ k \to i \to l}$ are nodes such that node k transmits packets to node l over node i as described above. If this equation is satisfied, then $t_{max} \leq F_{max}$ and source-destination pair (i,j) will use all assigned credits in less than $F_{max}$ time slots.

It is understood that the below implementation of Equation (2) provides computational simplicity as well as parallel processing when determining whether to accept new bandwidth requests.

A controller node stores the following: the number of credits assigned to each source-destination pair (k,l) $(a_{kl})$, the number of credits assigned to each source $s_k = \Sigma_m a_{km}$ the number of credits assigned to each destination $d_l = \Sigma_n a_{nl}$, the number of credits assigned to node pairs with node k in between $$l_k = \sum_{\substack{m,n \\ m \to k \to n}} a_{mn},$$

and the maximum number of credits assigned to destinations addressed by node k is $D_k = \max a_{kl>0} d_l$, i.e., the most heavily loaded receiver. When new bandwidth $\Delta a_{ij}$ is requested, it is allocated if the conditions specified in Equation 4 below are satisfied:

$$W \cdot (s'_k + D'_k) + 1'_k \leq F_{max}, \ 1 \leq k \leq N, \quad \text{Eq. (4)}$$

where:

$$a'_{ij} = a_{ij} + \Delta a_{ij}, \ s'_i = s_i + \Delta a_{ij}, \ d'_j = d'_j + \Delta a_{ij},$$

$$a'_{kl} = a_{kl}, \ s'_k = s_k, \ d'_l = d_l, \ 1 \leq k, \ 1 \leq N, \ k \neq i, \ l \neq j, \quad \text{Eq. (5)}$$

$$l'_k = \begin{cases} l_k + \Delta a_{ij} & : \ i \to k \to j \\ l_k & : \ \text{otherwise} \end{cases} \quad \text{Eq. (6)}$$

$$D'_k = \begin{cases} \max(D_k, d'_j) & : \ a'_{kj} > 0 \\ D_k & : \ \text{otherwise} \end{cases} \quad \text{Eq. (7)}$$

If the new request is accepted, the parameters of interest are updated $a_{ij} \leftarrow a'_{ij}$, $s_i \leftarrow s'_i$, $d_j \leftarrow d'_j$, $l_k \leftarrow l'_k$, $D_k \leftarrow D'_k$, $1 \leq k \leq N$. Note that comparisons and additions in Equations 5, 6, and 7 can be done in parallel for all nodes such that the time complexity of the algorithm is in the first order O(1).

In general, for uniform traffic each source-destination pair gets the same number of credits, and each link is equally loaded. The inequality defined in Equation 4 can be rewritten in Equation 8 as follows:

where $$\rho_T = W \cdot \sum_l a_{il} / F_{max} \quad \overset{2\rho_T + \rho_L \leq 1}{}$$

is the transmitter utilization, and $$\rho_L = \sum_{\substack{k,l \\ k \to i \to l}} a_{kl} / F_{max} \quad \text{Eq. (8)}$$

is the link utilization. Since a packet passes N/2 nodes on average, the average number of packets transmitted through the network is $\rho_L N/(N/2) = 2\rho_L$. Packets are transmitted at the bit-rate of WB, where B is the laser bit-rate. So, the average network throughput is $2\rho_L WB$. The average network throughput is also equal to the sum of average bit-rates that nodes generate, which is $\rho_T NB$. Thus it follows that the throughput can be expressed below in Equation 9:

$$2\rho_L WB = \rho_L NB \Rightarrow \rho_L = N\rho_L/2W, \quad \text{Eq. (9)}$$

From the inequalities expressed above, the resulting inequalities described in Equations 10a,b can be obtained:

$$\rho_T \leq \frac{1}{2+N/(2W)} \text{ and } \rho_L \leq \frac{1}{1+4W/N}. \quad \text{Eq. (10a, b)}$$

The guaranteed transmitter and link utilization for different node to wavelength ratios N/W is given in Table 1 below.

TABLE 1

| | Transmitter and link utilization [%] | | | | |
|---|---|---|---|---|---|
| N/W | 1 | 2 | 4 | 8 | 16 |
| ρT | 40 | 33 | 25 | 17 | 10 |
| ρL | 20 | 33 | 50 | 66 | 80 |

The transmitter utilization decreases approaching 2W/N as the number of nodes per wavelength increases since each node gets the smaller portion of the laser bit-rate. Also, the link utilization increases approaching 100% as the number of nodes per wavelength increases showing the benefits of the statistical multiplexing.

At initialization, nodes negotiate the maximum frame length, e.g., $F_{max}$ time slots. Credit negotiation is well known to one of ordinary skill in the art. A credit of one time slot per frame guarantees to the particular queue a bandwidth granularity G that can be expressed as set forth below in Equation 12:

$$G = W \cdot B / F_{max}, \quad \text{Eq. (12)}$$

where B is the laser bit-rate, and W is the number of different wavelengths. Bandwidth can be reallocated in an access time determined by the frame duration A as defined in Equation 13 below:

$$A = F_{max} T_p. \quad \text{Eq. (13)}$$

where $T_p$ is the time slot duration. The frame duration (or access time) should be sufficiently long to provide fine traffic granularity G, but short enough to respond to the fast traffic changes with relatively short access time A. Assuming for example, W=30, B=10 Gbps, $T_p$=50 ns, and $F_{max}$=10$^6$, a network provides a total capacity of WB=300 Gbps, a granularity G=0.3 Mbps, and an access time A=50 ms. Even in a high-capacity network with W=100 wavelengths and throughput of WB=1 Tbps, fine granularity, e.g., G=1 Mbps, and short access time, e.g., A=50 ms, are provided.

Due to the fine granularity and the fast access time, the network easily supports web browsing, streaming, and other dynamic applications that are dominant in data networks. Since a tunable laser can potentially transmit at the bit-rate of 10 Gbps, each node can serve thousands of broadband end-users.

As described above, there is a trade-off between traffic granularity and access time. For a fixed access time which is demanded by an application requirement, the traffic granularity (the minimum bandwidth that can be reserved) can be decreased only by decreasing the total network capacity. In one embodiment, different portions of the network capacity are pre-allocated to different groups of applications according to their bandwidth requirements. This arrangement simplifies the network control and utilizes the resources more efficiently.

The network architecture shown and described above naturally supports applications like web-browsing and video-streaming since it can provide a granularity of about 1 Mpbs and an access time of about 50 ms, for the total switching capacity of 1 Tbps. However, some applications such as voice, video-conferencing, audio-streaming etc. require much finer granularity. Finer granularity can be achieved by multiplexing traffic at the edge of the network. For example, one composite packet can comprise multiple packets carrying different applications between a particular source-destination pair. If there is not enough traffic between some source-destination pairs, assigned bandwidth is underutilized. Alternatively, different portions of bandwidth can be appropriately pre-allocated to different services in order to achieve efficient utilization.

From Equation 2 above, the granularity for the given network capacity can be decreased by increasing the frame length. But then, the access time is increased according to Equation 3. The tuning time of fast tunable lasers is roughly about 10 ns, and the packet slot should be much longer than the tuning time, e.g. $T_p$>50 ns. On the other side, interactive communications such as telephone calls and video conferencing require access times which are A<100 ms. Such a short access time is desirable for other applications as well. From these observations and Equation 3, it follows that the frame length should be $F_{max}$<10$^6$. So, in the network with a terabit switching capacity, granularity is G>1 Tbps/10$^6$=1 Mbps as calculated from Equation 2. Granularity can be also decreased by decreasing the network capacity, i.e. the number of wavelengths. It is understood that low-bandwidth-demanding applications require finer granularity, but at the same time a smaller network capacity. Voice requires a bit-rate of several kbps, video-conferencing and audio-streaming require several hundreds kbps, while web browsing and video-streaming require several Mbps. Consequently, it may be desirable to assign $W_1$ wavelengths to voice and control packets, $W_2$ wavelengths to video-conferencing and audio-streaming and $W_3$ wavelengths for web-browsing and video-streaming. Here, $W_3 \approx 10 \ W_2 \approx 100 \ W_1$.

Figure 5:
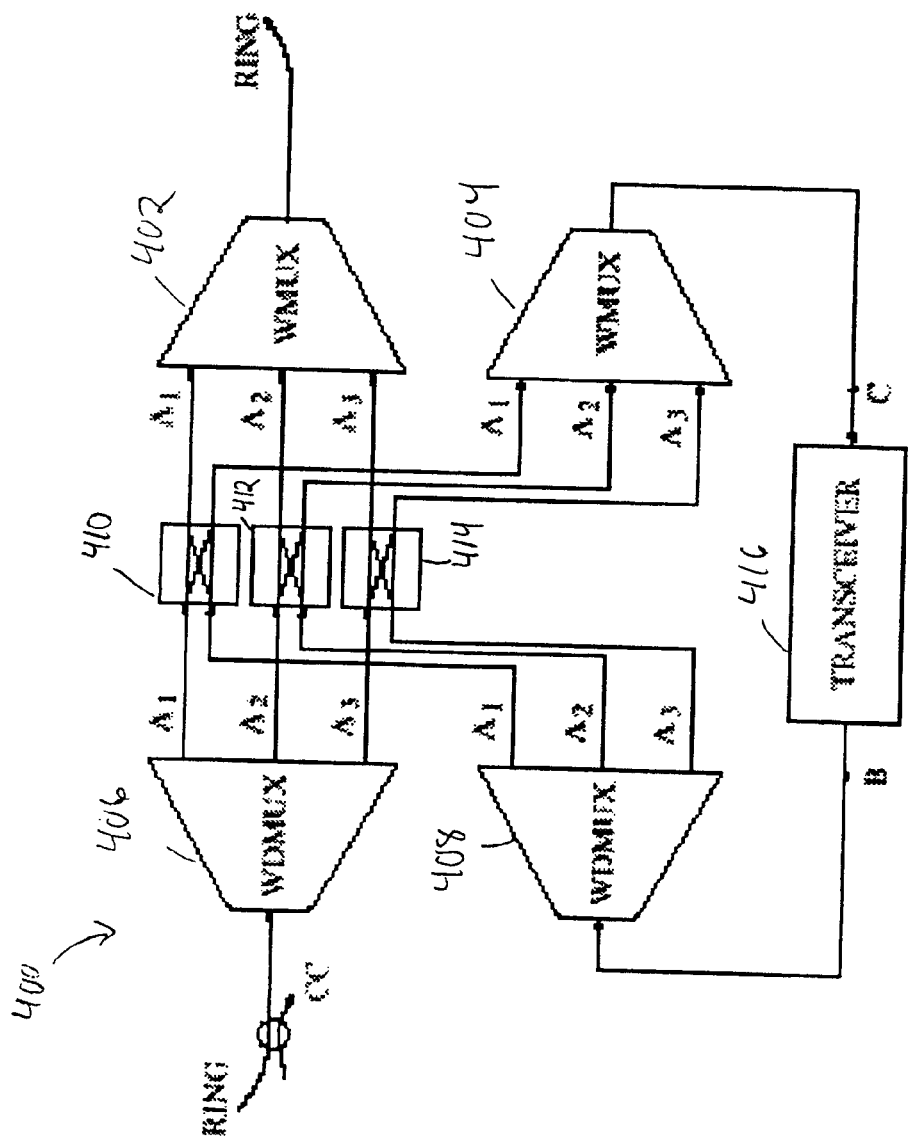
FIG. 5 is a schematic block diagram of a ring network architecture integrating multiple data services in accordance with the present invention.

As shown in FIG. 5, these three groups of applications can be integrated in a packet-switched ring network, such as the network described above. Different services are transported on three different sets of wavelengths $\Lambda_1, \Lambda_2, \Lambda_3$. Each node 400 includes first and second wavelength multiplexers 402, 404 and first and second wavelength demultiplexers 406, 408. First, second, and third switches 410, 412, 414 are coupled to the multiplexers and demultiplexers 402, 404, 406, 408 as shown. And a transceiver 416 is disposed between the second multiplexer 404 and the second demultiplexer 408.

The wavelength demultiplexers 406, 408 separate the three sets of wavelengths $\Lambda_1, \Lambda_2, \Lambda_3$ so that they can be selectively added and dropped at each node. A node can selectively drop and add any set of wavelengths by setting the appropriate (2×2) optical switch 410, 412, 414. A tunable laser (not shown) transmits only those wavelengths that are to be added, and these wavelengths are stacked. After the switching, wavelengths are combined by the wavelength multiplexers 402, 404. Only dropped wavelengths are unstacked.

Nodes make reservations on the control channel independently for different services. Also, MAC and admission control protocols are executed independently. Therefore, the granularity for this configuration is defined in Equation 14 and the access time for these services is defined in Equation 15 below:

$$G_1 = W_1 \cdot B / F_1, \ G_2 = W_2 \cdot B / F_2, \ G_3 = W_3 \cdot B / F_3, \quad \text{Eq. (14)}$$

$$A_1 = F_1 \cdot T_p, \ A_2 = F_2 \cdot T_p, \ A_3 = F_3 \cdot T_p. \quad \text{Eq. (15)}$$

For example, assuming $W_1=1$; $W_2=10$, $W_3=100$, $B=10$ Gbps, $T_p=50$ ns, and $F_1=F_2=F_3=10^6$, the network provides services with different granularities of $G_1=10$ kbps, $G_2=100$ kbps and $G_3=1$ Mbps, and fast access times of $A_1=A_2=A_3=50$ ms The separation of the services follows from the severe variations of the bandwidth requirements for different applications. The portion of the network capacity used for low-bandwidth applications is negligible, and can be pre-allocated. Otherwise, mismatch of the granularities in the network with integrated services can easily cause bandwidth under-utilization, e.g., assigning one credit that guarantees 1 Mbps to one telephone call requiring 10 kbps is undesirable bandwidth waste. Note also that the node complexity is only slightly increased by the service separation since all services share most of the optical devices at the node.

In one embodiment, best effort traffic transmission is utilized by the network. Best effort traffic refers to attempted transmission of packets by a node not having sufficient assigned credits for the transmission. In general, the node makes a transmission attempt without reserved time slots that can be either successful or unsuccessful. If unsuccessful, the transmission attempt is dropped.

It is understood that various modifications can be made to the above-described embodiments without departing from the present invention. For example, user nodes can be equipped with rapidly tunable transmitters and receivers. The transmitter and receivers can be attached to the ring network by the optical 2×2 coupler. Time can be divided into slots, e.g., no cycles. Nodes observe the control channel to determine which wavelengths and receivers are available in the next time slot, and reserve one of the available wavelengths and receivers. A node places the address of the reserved wavelength and receiver on the control channel and observes if any of the packets is transmitted to itself and tunes to the wavelength of that packet. The above-described MAC protocol and admission algorithm can readily support this architecture.

The present invention provides an architecture, MAC protocol and admission control mechanism to flexibly utilize a high-capacity packet-switched ring network. Wavelength stacking and unstacking simplifies the network control since it avoids fixed allocation of the wavelengths. A node makes reservations on the control channel, and learns about the existing reservation from the control channel. It does not reserve any output that has been already reserved in the current cycle of W time slots. Nodes are guaranteed negotiated shares of the ring capacity by using credits. A node can make reservations within a frame as long as it has credits, so that each node is guaranteed a negotiated number of credits within the specified maximum frame length. Admission of new bandwidth request depends only on the utilization of nodes and links in the network requiring minimal time complexity on the order of O(1).

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A method for controlling admission of new bandwidth reservation in an WDM optical ring network, comprising:

receiving a band width request for a node source-destination pair;

determining whether there is sufficient network capacity for the bandwidth request;

updating the number of credits per frame to be assigned to input-output pairs whenever the bandwidth is requested and/or previously assigned bandwidth is released;

renewing credits by loading queue counters to specified numbers at the beginning of each frame; and reserving time slots available within a frame via a control channel if the queue counters are positive, and decrementing the corresponding queue counter whenever the reservation is made; and assigning $a_{ij}>0$ time slots to node source-destination pair $(i, j)$, $1 \leq i$, $j \leq N$, within a frame of length $\leq F_{max}$, if the conditions expressed as $$W \cdot \left( \sum_l a_{il} + \sum_k a_{kj} \right) + \sum_{\substack{k,l \\ k \to i \to l}} a_{kl} \leq F_{max}.$$

are satisfied, where W represents the number of wavelengths in the composite packet, k, l, k→i→l are nodes such that node k transmits packets to node l over node i, and $a_{il}$, $a_{kj}$, and $a_{kl}$ represent respective time slots assigned to the node source-destination pair.

2. The method according to claim 1, further including determining whether there is sufficient network capacity for bandwidth request $\Delta a_{ij}$, by determining whether conditions $W \cdot (s'_k + D'_k) + l'_k \leq F_{max}$, $1 \leq k \leq N$ are satisfied, where:

$a'_{ij}=a_{ij}+\Delta a_{ij}$, $s'_i=s_i+\Delta a_{ij}$, $d'_j=d_j+\Delta a_{ij}$, $a'_{kl}=a_{kl}$, $s'_k=s_k$, $d'_l=d_l$, $1 \leq k$, $l \leq N$, $k \neq i$, $l \neq j$, $$l'_k = \begin{cases} l_k + \Delta a_{ij} & : i \to k \to j \\ l_k & : \text{otherwise} \end{cases}$$

$$D'_k = \begin{cases} \max(D_k, d'_j) & : a'_{kj} > 0 \\ D_k & : \text{otherwise} \end{cases}.$$

* * * * *